Dec. 15, 1942.    H. L. MYERS    2,305,547
DISPLAY DEVICE
Filed March 28, 1941    2 Sheets-Sheet 1
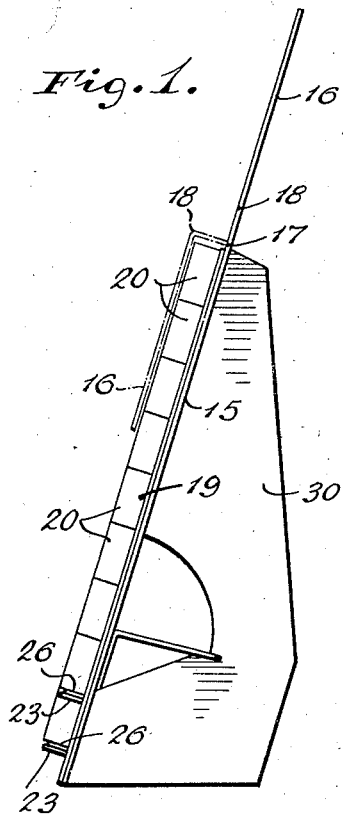
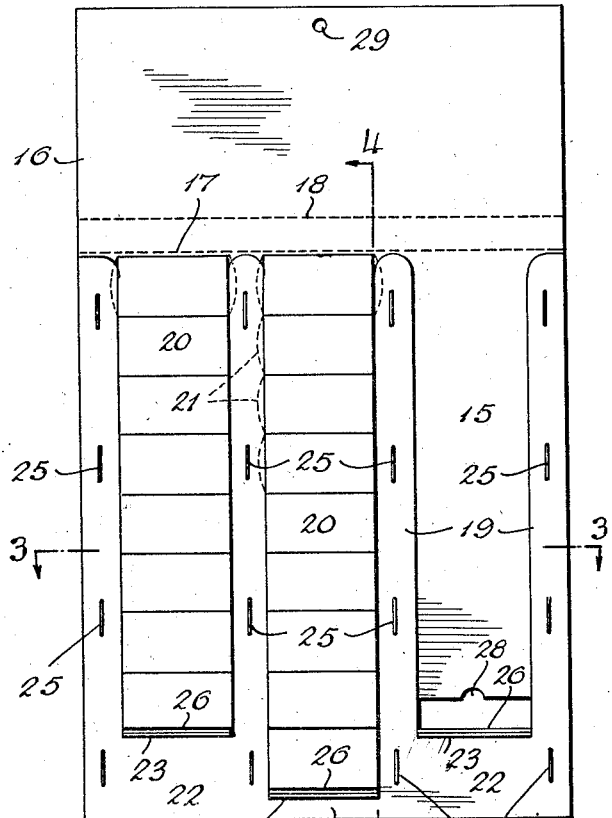
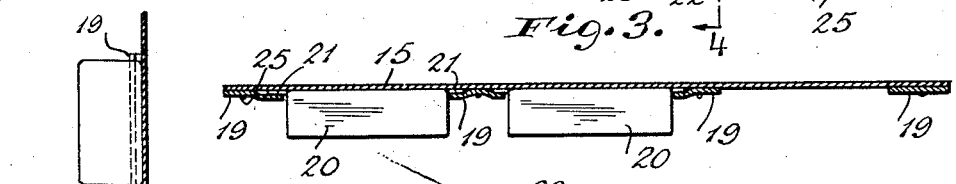
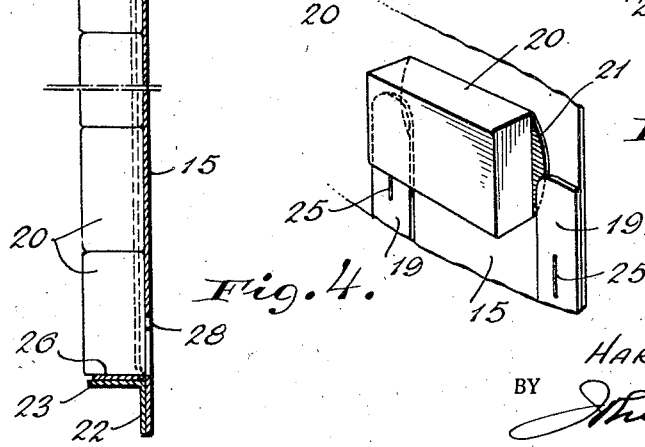
INVENTOR.
HAROLD L. MYERS
BY
ATTORNEY Dec. 15, 1942. H. L. MYERS 2,305,547
DISPLAY DEVICE
Filed March 28, 1941 2 Sheets-Sheet 2
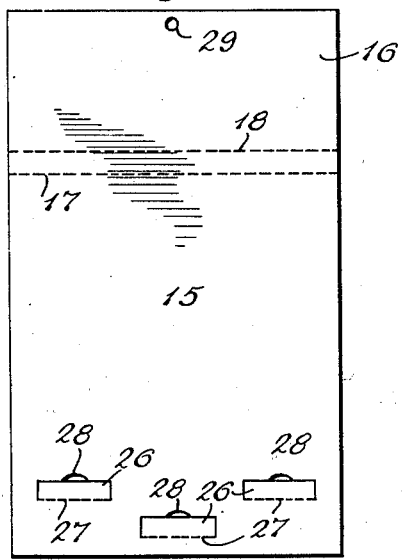
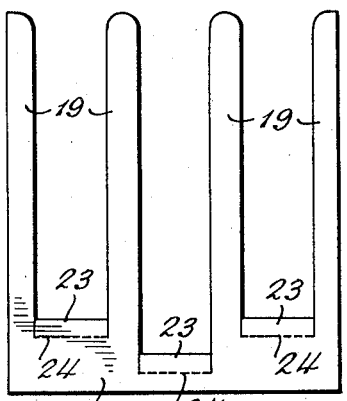
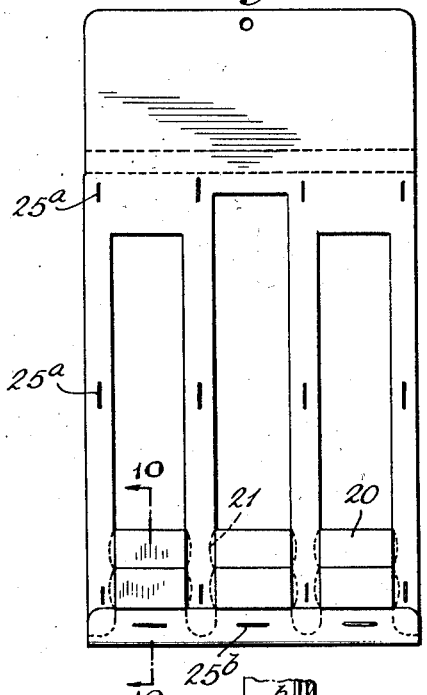
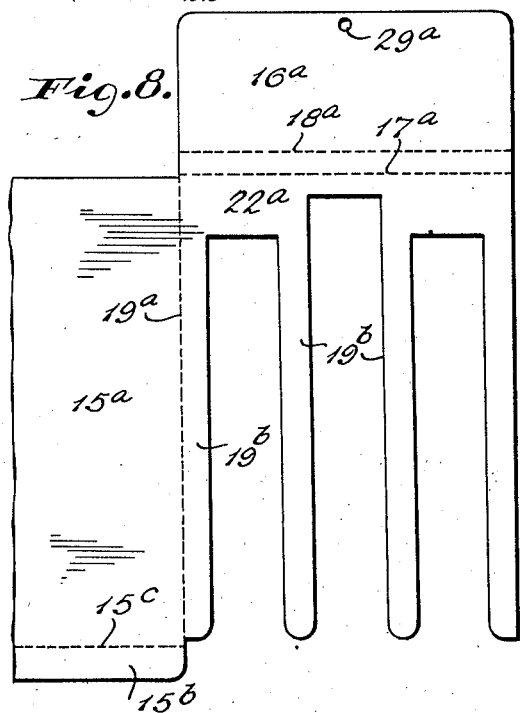
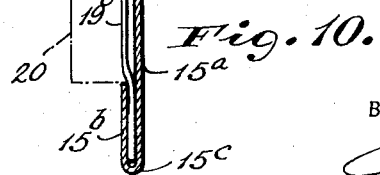
INVENTOR.
HAROLD L. MYERS
BY
ATTORNEY

Patented Dec. 15, 1942

2,305,547

UNITED STATES PATENT OFFICE 2,305,547

DISPLAY DEVICE

Harold L. Myers, Morristown, N. J.

Application March 28, 1941, Serial No. 385,606

2 Claims. (Cl. 206—80)

The invention relates to display devices of the type which are commonly made of cardboard or similar material and has for its object to provide a display device of the indicated character constructed in a novel manner to receive a plurality of articles of merchandise and to removably support the same attractively in display arrangement.

The invention contemplates further a display device provided with novel receiving and holding means whereby the loading of the display device with articles of merchandise and the removal of the latter therefrom at will is facilitated and whereby the articles of merchandise are exposed to view in the display positions thereof to a maximum extent.

A further object of the invention is to provide a display device provided with clamping means arranged to co-operate with projections on articles of merchandise in the form of packages for the purpose of removably clamping the latter in one or a plurality of columns in display position on said display device.

Other objects will appear from the description hereinafter and the features of novelty will be pointed out in the claims.

In the accompanying drawings, which illustrate examples of the invention without defining its limits, Fig. 1 is a side elevation of the novel device in an operative display position;

Fig. 2 is a front face view thereof;

Fig. 3 is a horizontal section on an enlarged scale on the line 3—3 of Fig. 2;

Fig. 4 is an enlarged vertical section on the line 4—4 of Fig. 2;

Fig. 5 is a fragmentary perspective view showing a package of merchandise being combined with the device;

Figs. 6 and 7 are face views of the separate elements of the device shown in Figs. 1 and 2;

Fig. 8 is a face view of a second form of the device in which the elements are foldably associated with each other, and showing said elements in an unfolded condition;

Fig. 9 is a front face view of said second form of the device in its folded set up condition, and Fig. 10 is a fragmentary enlarged section on the line 10—10 of Fig. 9.

The novel display device is primarily designed for receiving and displaying articles of merchandise in the form of packages and for removably clamping said packages in display position, and preferably is arranged to receive a plurality of such packages and to removably hold the same in one or more columns. Obviously the novel display devce may be constructed to accommodate articles of merchandise which are not packaged and the following description and the claims are to be construed accordingly. In the illustrated examples the display device is designed for receiving rectangular packages of merchandise as exemplified by conventional packages of safety razor blades of the type which include opposite end projections or their equivalent, with which the clamping means of the display device co-operates to removably fix said packages in display positions thereon. For convenience the description is directed to this type of package and display device without however intending thereby to define the limits of the invention.

In the form illustrated in Figs. 1 to 7, inclusive, the display device comprises a supporting means or backing exemplified by a rectangular member 15 of cardboard or other suitable material and of any convenient predetermined dimensions. At its upper end the member 15 is provided with a conterminous extension 16 on the front face of which suitable advertising matter may be produced in any conventional manner. Score lines 17 and 18 located in spaced parallel relation to each other extend transversely across the device as shown in Fig. 2, and generally are spaced apart to an extent dependent upon the articles of merchandise for which the device is designed as will appear more fully hereinafter.

The front surface of the rectangular member 15 or its equivalent, which constitutes the display face of the device is provided with clamping means for removably clamping articles of merchandise in engagement with said display face in exposed display relation thereto. In its illustrated form the clamping means comprises clamping members 19 located on the display face of the member 15 in co-operating pairs in spaced parallel relation to each other for removably clamping articles of merchandise in engagement with said display face in one or more columns in display relation thereto. In the specific arrangement shown in Figs. 1 to 7, inclusive, the clamping means is in the form of a unit separate from the rectangular member 15 and attached thereto in the manner which will be pointed out hereinafter. The clamping unit may be made of any suitable material which provides the desired results, and generally is made of cardboard or the like and in a form designed in accordance with the type and number of articles of merchandise for which the display device is intended. The illustrated example accordingly shows a clamping unit arranged for the reception of a number of articles of merchandise in the form of rectangular packages 20 exemplified by conventional packages of safety razor blades and including opposite end projections 21 which constitute extensions of the bottoms of said projections and generally are of curved form as illustrated in Figs. 2 and 5.

The clamping unit includes at least two clamping members 19 in spaced parallel relation and may include additional clamping members 19 to increase the capacity of the device. In any case, the clamping members 19 in co-operating pairs are connected with and project from a transverse section 22, which may be provided with one or more flaps 23 in registry with the spaces between adjacent members 19 and foldable on score lines 24 to constitute supporting stops for the articles or packages 20 as will be more fully set forth hereinafter. Preferably the upper ends of the clamping members 19 are rounded or otherwise shaped in an equivalent manner to facilitate the placement of the articles 20 in position on the display device. The clamping unit may be made in any convenient manner and preferably is cut from a sheet of material so that the members 19 and transverse section 22 as well as the flaps 23 are integral parts of said unit. The latter is dimensioned to properly fit the associated member 15 and in the assembled condition lies in surface engagement with the display face of said member 15 as shown in Fig. 2. The clamping unit is secured to the member 15 in any convenient manner so as to leave the longitudinal edge portions of the clamping members 19 free from and relatively movable to the display face of said member 15. In the illustrated example wire staples 25 serve to fasten the members 19 as well as the transverse section 22 in surface engagement with the member 15. As shown in Fig. 2, the staples 25 are located at spaced intervals along the longitudinal centers of the members 19 and thus leave the longitudinal edge portions thereof free to move relatively to the member 15. The parts preferably are dimensioned and designed so that the clamping unit and member 15 will register with each other when combined as illustrated in Fig. 2, with the free ends of the clamping members 19 located approximately at the score line 17.

In the form of the device shown in the drawings the member 15 is provided with flaps 26 preferably cut therefrom and foldable on score lines 27 in associated reinforcing relation to the flaps 23 for the purpose which will be referred to hereinafter. To facilitate the manipulation of the flaps 26 finger recesses 28 may be provided adjacent thereto in the member 15, as shown in Fig. 6. In some forms of the device either the flaps 23 or 26 may be omitted and the flaps 26 or 23 respectively alone included therein, while in other forms of the device all of the flaps 23 and 26 may be omitted, and the registering edge portions of the section 22 relied upon as supporting stops for the columns of packages 20 or their equivalent.

The device may be provided with means for supporting it in display position, said means comprising a simple aperture 29 for suspending the device or a foldable easel 30 of any conventional type connected with the member 15 for supporting the device in an upright inclined display position as shown in Fig. 1.

In practice, the display device of Figs. 1 to 7, inclusive, in its initial condition presents the appearance shown at the right hand of Fig. 2, it being understood that at this stage the easel 30 occupies its conventional folded position in surface engagement with the rear face of the supporting member 15. To combine the packages 20 with the display device, or in other words, to load said device, the packages 20 are inserted into the space between two adjacent clamping members 19 with the end projections 21 of the packages 20 extending beneath the free longitudinal edge portions of the clamping members 19. Because of the curved form of the projections 21 and the rounded ends of the clamping members 19, the insertion of the packages 20 into display position is facilitated and reduced to the simplest operation as shown in Fig. 5. Previous to this the flaps 23 and 26 have been folded on the respective score lines 24 and 27 so as to project perpendicularly to the display face of the member 15, as illustrated in Fig. 4. The first package 20 is moved lengthwise of the clamping members 19 until it rests upon the flanges 23 and 26 after which additional packages 20 are successively inserted into place between associated clamping members 19 with the projections 21 of said packages likewise projecting beneath said associated clamping member 19. This operation is continued until a plurality of packages 20 are located in a column between the associated clamping members 19 with the projections 21 of said packages extending beneath said clamping members, all as shown in Fig. 2. If the particular display device has additional capacity, the above operation of combining packages 20 therewith is continued until the maximum number of packages 20 for which the display device is designed have been combined therewith. Because of the inherent flexibility of the clamping members 19 and because the insertion of the projections 21 of the packages 20 flexes the free longitudinal edge portions of the clamping members 19, the latter develop a clamping action on the projections 21 whereby the packages 20 are clamped in engagement with the display face of the supporting member 15 in exposed display relation thereto.

When the display device has been filled to capacity, the storage or shipment thereof in quantity may be facilitated by folding the extension 16 on the score lines 17 and 18 to the position shown by dotted lines in Fig. 1. The location and spacing of the score lines 17 and 18 is predicated on the extent to which the packages 20 project from the display face of the member 15 and is such as to cause the extension 16 in its folded position to lie approximately flat upon the packages 20, as shown in Fig. 1. In this condition the loaded packages are compact and of relatively reduced dimensions and are easily stacked in large numbers for either storage or shipment.

When it is desired to support the loaded display device in display position it may either be suspended by means of the suspending aperture 29 or the easel 30 may be adjusted to its operative position for supporting the display device in the upright inclined display position illustrated in Fig. 1. In either display position the packages 20 may be readily removed from the device either singly or in any number for distribution and sale by simply sliding said packages lengthwise of the clamping members 19 toward the rounded ends thereof.

As shown in Figs. 8, 9, and 10, the display device comprises a unitary structure preferably constructed from a single sheet of material in which the supporting member and clamping unit are foldably connected with each other. In the specific form illustrated in the drawings, the supporting member is exemplified by a rectangular member 15a provided at its lower end with a flap 15b foldable on a score line 15c for the purpose to be more fully described hereinafter. The rectangular member 15a is foldably connected with one longitudinal edge of the clamping unit or, in other words, is foldable on a score line 19a extending lengthwise of one of the lateral clamping members 19b. The latter which corresponds to the clamping members 19 of the first form extend downwardly from and constitute integral parts of a transverse section 22a and have their lower free end rounded or otherwise shaped to facilitate the insertion of the article of merchandise into display position on the display device. In other words, the clamping members 19b in this form are reversed with respect to the clamping members 19 of the form first described. As shown in Figs. 8 and 9 the form of the display device now being described differs from the first form also in the fact that the extension 16a, which corresponds to the previously mentioned extension 16, projects from and in conterminous relation to the clamping unit instead of forming an integral part of the supporting member 15. The extension 16a is foldable over the packages or other articles of merchandise on score lines 17a and 18a which correspond to the score lines 17 and 18 of the first form of the display device. In all other respects the alternative form of the display device shown in Figs. 8, 9 and 10 may correspond to the form of device shown in the other figures of the drawings.

To set up this alternative form of the novel display device the rectangular member 15a and the clamping unit are folded on the score line 19a into surface engagement with each other as shown in Fig. 9, and are secured together in any convenient manner as by means of wire staples 25a corresponding to the staples 25 and correspondingly located with respect to the clamping members 19b.

The instant display device is loaded by inserting the packages 20 between adjacent clamping members 19b from below with the projections 21 extending beneath said clamping members 19b, as in the first form. When the device now being described has been loaded to capacity, the flap 15b is folded on the score line 15c so as to lie over the rounded ends of the clamping members 19b and over the spaces between said members and is fixed in this folded position in any convenient manner as by means of wire staples 25b to form a supporting stop for the packages 20.

For the purpose of storing and shipping the loaded display device under discussion, the extension 16a may be folded on the score lines 17a and 18a over and into engagement with the packages 20 in the same way as indicated by dotted lines in Fig. 1. This loaded display device may be suspended in display position by means of a suspending aperture 29a or in an inclined upright display position by means of an easel corresponding to the easel 30 of Fig. 1. The packages 20 or equivalent articles of merchandise are removably clamped in display position on the display face of the rectangular member 15a in the same way as in the form first described. To remove the packages 20 from this form of the display device a pull is exerted on the package or packages sufficient to flex the projections 21 from beneath the clamping members 19b.

In both of the illustrated forms of the display device the packages when in place on the device are fully exposed to view in an attractive display position and are readily removed at will for the purpose of sale or other dispensation.

In the preferred construction, the clamping members 19—19a, or their equivalent, are spaced apart in dependence upon the dimensions of the articles of merchandise for which the particular display device is designed. The arrangement preferably is such that the opposed edges of adjacent clamping members will serve as guides for guiding the articles of merchandise such as the packages 20 lengthwise of said clamping members to their final display positions on said device.

The novel display device presents the distinct advantage that the packages may be inserted into place thereon either individually by hand or automatically directly from the machines in which the contents of the packages are inserted and the packages closed. An important feature of the display device resides in the fact that a plurality of packages or equivalent articles of merchandise sufficient to constitute one complete display column thereof may be coincidentally combined with the display device either manually or automatically.

The device in all of its forms is simple in construction and economical in production and requires no particular skill either in combining the articles of merchandise therewith or in removing said articles therefrom.

Although the present invention has been described in conjunction with preferred embodiments, it is to be understood that modifications and variations may be resorted to without departing from the spirit and scope of the invention, as those skilled in the art will readily understand. Such variations and modifications are considered to be within the purview and scope of the claims.

I claim:

1. In a display device of merchandise packages, the latter having projections extending in opposite directions therefrom, the combination of a supporting member having a display face, a clamping unit secured in surface engagement with the display face of said supporting member and consisting of a transverse section and spaced parallel clamping members projecting therefrom in the surface plane of said transverse section and having their longitudinal edge portions free to overlap the projections of said packages whereby the latter are removably and slidably clamped in engagement with said display face in exposed display relation thereto, a flap on said supporting member foldable into perpendicular relation thereto in registry with the space between said clamping members to constitute a support for said packages, and a flap on said transverse section foldable relatively thereto into reinforcing supporting relation to the flap of said supporting member.

2. A display device comprising a supporting member having a display face, a clamping unit foldably connected with said supporting member and secured in engagement with the display face thereof, said clamping unit comprising a transverse section and spaced parallel clamping members projecting downwardly therefrom for removably clamping articles of merchandise in engagement with said display face in exposed display relation thereto, and a flap foldably connected with the lower edge of said supporting member and foldable over said clamping members to bridge the space therebetween, said flap being secured in its folded position to constitute a support for said packages.

HAROLD L. MYERS.